Patented Aug. 22, 1933

1,923,583

UNITED STATES PATENT OFFICE 1,923,583

PRODUCTION OF LIQUID UNSATURATED HYDROCARBONS OF HIGH MOLECULAR WEIGHT

Wilhelm Pungs, Ludwigshafen-on-the-Rhine, and Hans Rabe, Mannheim, Germany, assignors to I. G. Farbenindustrie Aktiengesellschaft, Frankfort-on-the-Main, Germany No Drawing. Application August 10, 1931, Serial No. 556,318, and in Germany August 23, 1930

9 Claims. (Cl. 260—170)

The present invention relates to improvements in the production of liquid unsaturated hydrocarbons of high molecular weight.

It is already known that olefines may be polymerized by the action of aluminium chloride into oily products capable of being employed for example as lubricating oils and that ethylene may be converted into butylene under the influence of boron fluoride.

We have now found that olefines of low molecular weight in particular those containing up to 5 carbon atoms in the molecule, or mixtures thereof, such as are obtained for example by cracking solid or liquid paraffin or napthene hydrocarbons, as for example hard or soft paraffin waxes, ceresine, heavy and middle oils, paraffin oil, petroleum fractions, or by the low temperature carbonization of coals of all varieties, such as mineral coal or brown coal are converted into valuable olefines liquid at ordinary temperature and under atmospheric pressure by leading them over inorganic anhydrous halides which have a sublimation temperature or boiling point lying between 100° and 800° C., as for example volatilizable chlorides, bromides, iodides or fluorides of aluminium, tin, antimony or iron and the like and which in many cases give rise to a strong evolution of heat when treated with water, such as zinc chloride, the duration of contact being between 0.5 and 100 seconds and preferably between 1 and 65 seconds, an elevated temperature below 300° C., and below that at which substantial vaporization of the catalyst begins being maintained. The said inorganic halides may be employed alone, in admixture with each other and/or in admixture with substances serving as carriers, as for example pumice stone, Florida earth, alumina or burnt fireclay. The olefines employed may consist of ethylene, propylene or butylene or mixtures of these and may be diluted with extraneous gases, such as methane, ethane, hydrogen, nitrogen or the like. According to the said conditions, the speed of flow should be regulated so that the gas mixture remains from about 0.5 to 100 seconds in the catalyst chamber. Depending on the desired results, the temperature should be kept between about 40° and 300° C. and preferably below 200° C. Temperatures are preferably employed at which no substantial volatilization of the inorganic halide employed as catalyst takes place. Frequently the rate of flow may be regulated so that after setting up the optimum temperature the reaction proceeds without further external supply of heat.

In the said process it is essential that all the reagents in contact with the catalyst should be in the gaseous phase.

The process is usually carried out under atmospheric pressure.

The products obtained are liquid at ordinary temperature and unsaturated and may be employed as such, as for example as additions to benzines in order to improve the non-knocking properties of said benzines, or as initial materials for polymerization, condensation, adding on and the like reactions. They usually consist of hydrocarbons containing between 5 and 8 carbon atoms in the molecule.

The following examples will further illustrate the nature of this invention but the invention is not restricted to these examples. The parts are by weight.

Example 1

A mixture of gaseous olefines of the composition given below is led at from 140° to 160° C. through a tube which contains 1 part of solid aluminium chloride and 20 parts of pumice stone in such a manner that the gas mixture remains in contact with the catalyst for from about 7 to 8 seconds. As soon as the reaction has set in, further supply of heat is unnecessary. A reaction product is obtained which consists mainly of liquid unsaturated hydrocarbons as will be seen from the following table showing the composition of the initial gas mixture and the reaction product:

|  | Initial-gas mixture | Reaction product |
|---|---|---|
|  | Percent | Percent |
| Ethylene | 56.5 | 2.3 |
| Propylene | 22.0 | 5.4 |
| Butylene | 10.0 | 17.8 |
| Heavier unsaturated hydrocarbons | 5.0 | 63.4 |
| Butadiene | 6.5 | 11.1 |

Example 2

A cracking gas containing 17 per cent of hydrogen, 5 per cent of nitrogen, 18 per cent of methane, 3 per cent of ethane, 34 per cent of ethylene, 15 per cent of propylene, 6 per cent of butylene, and 2 per cent of unsaturated hydrocarbons of higher molecular weight is passed through a porcelain tube containing a catalyst comprising 1 part of solid aluminium chloride, 2 parts of cobalt chloride and 20 parts of pumice stone. A temperature of about 185° C. is maintained and the rate of flow is such that the gas mixture remains in contact with the catalyst for about 1 to 2 seconds. Of the olefines in the initial gases 85 per cent are converted into liquid hydrocarbons of unsaturated nature boiling above 25° C. Besides this 8.5 per cent of the olefines are present in the reaction product as ethylene, 2.5 per cent as propylene and 4 per cent as butylene.

Example 3

A gas mixture containing 55 per cent of gaseous olefines is passed through a tube containing 4 parts of aluminium chloride, 1 part of cobalt chloride, and 20 parts of pumice stone. A temperature of about 100° C. is maintained and the gas mixture remains in contact with the catalyst for about 36 seconds. From 100 liters of gas mixture 35 grams of liquid unsaturated hydrocarbons boiling above 20° C. are obtained which have a bromine value of 168.

Example 4

A dry gas mixture containing 36 per cent of olefines is passed at a temperature of about 110° C. over a catalyst consisting of 3 parts of cobalt chloride, 2 parts of copper chloride and 15 parts of pumice stone. The rate of flow is so adjusted that the duration of contact of the gas mixture with the catalyst is from 72 to 75 seconds. From 100 liters of the gas mixture 24 grams of liquid hydrocarbons boiling above 20° C. are obtained which have a bromine value of 151.

Example 5

If in the process according to Example 4, the gas be saturated with water vapor, 29 grams of liquid hydrocarbons are obtained from each 100 liters of initial gas. The said hydrocarbons boil above 20° C. and have a bromine value of 154.

Example 6

A gas containing 60 per cent of olefines is passed at a temperature of about 100° C. through a tube filled with a mixture of fragments of V2A steel, aluminium chloride and ferric chloride. The said fragments of V2A steel facilitate the fine division of and the transference of heat to the aluminium chloride and ferric chloride. The temperature is maintained at about 100° C. and the rate of flow is such that the materials remain in contact with the catalyst for about 60 seconds. From each 100 liters of gas treated, 28 grams of liquid hydrocarbons boiling above 25° C. are obtained which have a bromine value of about 275.

What we claim is:—

1. A process for the conversion of an olefine of low molecular weight into liquid olefinic hydrocarbons of higher molecular weight which comprises contacting said olefine in the gaseous phase, at an elevated temperature below 300° C. and for a duration of from 0.5 to 100 seconds with a solid mass comprising an inorganic anhydrous halide which becomes gaseous only at a temperature between 100° and 800° C.

2. A process for the conversion of an olefine having at the most 5 carbon atoms in the molecule into liquid olefinic hydrocarbons, which comprises contacting said olefine at an elevated temperature below 300° C., under ordinary pressure and for a duration of from 0.5 to 100 seconds with a solid mass comprising an inorganic anhydrous halide which becomes gaseous only at a temperature between 100° and 800° C.

3. A process for the conversion of an olefine having at the most 5 carbon atoms in the molecule into liquid olefinic hydrocarbons, which comprises contacting said olefine at a temperature between 40° and 200° C., under ordinary pressure and for a duration of from 1 to 65 seconds with a solid mass comprising an inorganic anhydrous halide which becomes gaseous only at a temperature between 100° and 800° C.

4. A process for the conversion of an olefine having at the most 5 carbon atoms in the molecule into liquid olefinic hydrocarbons, which comprises contacting said olefine at a temperature between 40° and 200° C., under ordinary pressure and for a duration of from 1 to 65 seconds with a solid mass comprising aluminium chloride.

5. A process for the conversion of an olefine having at the most 5 carbon atoms in the molecule into liquid olefinic hydrocarbons, which comprises contacting said olefine at an elevated temperature between 40° and 200° C., under ordinary pressure and for a duration of from 1 to 65 seconds with a solid mass comprising a mixture of aluminium chloride and pumice stone.

6. A process for the conversion of an olefine having at the most 5 carbon atoms in the molecule into liquid olefinic hydrocarbons, which comprises contacting said olefine at an elevated temperature between 40° and 200° C., under ordinary pressure and for a duration of from 1 to 65 seconds with a solid mass comprising a mixture of aluminium chloride, cobalt chloride and pumice stone.

7. A process for the production of liquid olefines which comprises contacting a gas mixture consisting mainly of gaseous olefines at a temperature between 140° and 160° C. and for a duration of from about 7 to 8 seconds with a solid mass comprising a mixture of about 1 part of anhydrous aluminium chloride and 20 parts of pumice stone.

8. A process for the conversion of an olefine of low molecular weight into liquid olefinic hydrocarbons of higher molecular weight which comprises contacting said olefine in the gaseous phase and in the presence of a substantial amount of water vapor, at an elevated temperature below 300° C. and for a duration of from 0.5 to 100 seconds with a solid mass comprising an inorganic anhydrous halide which becomes gaseous only at a temperature between 100° and 800° C.

9. A process for the conversion of an olefine having at the most 5 carbon atoms in the molecule into liquid olefinic hydrocarbons, which comprises contacting said olefine at an elevated temperature between 40° and 200° C. and in the presence of a substantial amount of water vapor, under ordinary pressure and for a duration of from 1 to 65 seconds with a solid mass comprising a mixture of aluminium chloride and pumice stone.

WILHELM PUNGS.
HANS RABE.